(12) United States Patent
Wakana et al.

(10) Patent No.: US 10,649,065 B2
(45) Date of Patent: May 12, 2020

(54) POSITION DETECTION SYSTEM

(71) Applicant: ALPS ALPINE CO., LTD., Ota-ku, Tokyo (JP)

(72) Inventors: Keigo Wakana, Miyagi-Ken (JP); Daisuke Takai, Miyagi-Ken (JP); Yukimitsu Yamada, Miyagi-Ken (JP); Toshiki Nakamura, Miyagi-Ken (JP); Hironori Takayama, Miyagi-Ken (JP)

(73) Assignee: ALPS ALPINE CO., LTD., Tokyo (JP)

( * ) Notice: Subject to any disclaimer, the term of this patent is extended or adjusted under 35 U.S.C. 154(b) by 55 days.

(21) Appl. No.: 16/128,727

(22) Filed: Sep. 12, 2018

(65) Prior Publication Data

US 2019/0011528 A1 Jan. 10, 2019

Related U.S. Application Data

(63) Continuation of application No. PCT/JP2017/002397, filed on Jan. 24, 2017.

(30) Foreign Application Priority Data

Mar. 16, 2016 (JP) .................................. 2016-052592

(51) Int. Cl.
*G01S 5/14* (2006.01)
*G01S 13/87* (2006.01)
(Continued)

(52) U.S. Cl.
CPC .............. *G01S 5/14* (2013.01); *G01S 13/767* (2013.01); *G01S 13/878* (2013.01);
(Continued)

(58) Field of Classification Search
CPC ........ G01S 1/02; G01S 13/767; G01S 13/878; G01S 17/08; G01S 2013/466;
(Continued)

(56) References Cited

U.S. PATENT DOCUMENTS

| | | | |
|---|---|---|---|
| 9,031,775 B2 * | 5/2015 | Vargas | G01S 5/0221 342/450 |
| 2014/0266912 A1 * | 9/2014 | Sendonaris | G01S 19/28 342/458 |

(Continued)

*Primary Examiner* — Olumide Ajibade Akonai
(74) *Attorney, Agent, or Firm* — Hunton Andrews Kurth LLP

(57) ABSTRACT

In a position detection system that has a plurality of transmitters/receivers placed at least three positions: processing is executed to measure distances among the plurality of transmitters/receivers, each distance being measured a plurality of times, and obtain a minimum value for each distance; processing is executed to obtain an angle between each two adjacent straight lines, each of which is one of straight lines that mutually connect the plurality of transmitters/receivers, by using minimum values, each of which is the minimum value for each distance; and if the absolute value of the difference between 180 degrees and the sum of angles, each of which is the angle between each two adjacent straight lines, inside a triangle formed by straight lines that interconnect three of the plurality of transmitters/receivers is smaller than a predetermined value, processing is executed to take the minimum values as the true values of the distances.

3 Claims, 12 Drawing Sheets

(51) Int. Cl.
*G01S 13/76* (2006.01)
*G01S 13/46* (2006.01)
*H04W 64/00* (2009.01)

(52) U.S. Cl.
CPC ... *G01S 2013/466* (2013.01); *G01S 2013/468* (2013.01); *H04W 64/00* (2013.01)

(58) Field of Classification Search
CPC .... G01S 2013/468; G01S 5/0289; G01S 5/12; G01S 5/14; G01S 5/22; H04W 64/006
See application file for complete search history.

(56) References Cited

U.S. PATENT DOCUMENTS

2014/0334463 A1\* 11/2014 Lipman .................... G01S 5/14
370/338
2017/0030998 A1\* 2/2017 Passler .................... G01S 5/14

\* cited by examiner

POSITION DETECTION SYSTEM

CLAIM OF PRIORITY

This application is a Continuation of International Application No. PCT/JP2017/002397 filed on Jan. 24, 2017, which claims benefit of Japanese Patent Application No. 2016-052592 filed on Mar. 16, 2016. The entire contents of each application noted above are hereby incorporated by reference.

BACKGROUND OF THE INVENTION

1. Field of the Invention

The present invention relates to a position detection system that detects the position of a movable object such as, for example, an automobile, a cargo, a commercial product stored in a warehouse, or a human.

2. Description of the Related Art

A monitoring system described in Japanese Unexamined Patent Application Publication No. 2014-169908 has a plurality of monitoring slave devices and a monitoring master device. The plurality of monitoring slave devices transmits radio signals. The monitoring master device receives the radio signals transmitted from the plurality of monitoring slave devices.

In the monitoring system described in Japanese Unexamined Patent Application Publication No. 2014-169908, the plurality of monitoring slave devices transmit radio signals in different transmission areas, each of which includes an area in which the monitoring master device is installed. The radio signals transmitted from the plurality of monitoring slave devices are at mutually different frequencies. The monitoring master device receives the radio signals transmitted from the plurality of monitoring master device, calculates a space feature value for each received radio signal according to it, and monitors the motion of a human in the transmission area corresponding to the radio signal according to the calculated space feature value.

According to the monitoring system described in Japanese Unexamined Patent Application Publication No. 2014-169908, from the frequency of a radio signal used to monitor the motion of a human, the transmission area from which the radio signal has been transmitted can be identified, so the position at which the human is present in the area eligible for detection can be identified.

SUMMARY OF THE INVENTION

In measurement of the position of a human in the area eligible for detection, it is necessary to measure a distance between the monitoring master device and each of the plurality of monitoring slave devices. To measure a distance between the monitoring master device and each of the plurality of monitoring slave devices, it is necessary to grasp the positional coordinates of each of the plurality of monitoring slave devices in advance. It is possible for a person to manually measure the positional coordinates of each of the plurality of monitoring slave devices by using, for example, a measuring tape. If, however, distances among the plurality of monitoring slave devices are relatively long or the number of the plurality of monitoring slave devices is relatively large, a problem arises in that the efficiency of measuring coordinates is lowered and it takes time.

The present invention addresses the conventional problem described above by providing a position detection system that can efficiently measure the positional coordinates of a plurality of transmitters/receivers.

In a position detection system that has a plurality of transmitters/receivers placed at least three positions, the present invention is characterized in that: processing is executed to measure distances among the plurality of transmitters/receivers, each distance being measured a plurality of times, and obtain a minimum value for each distance; processing is executed to obtain an angle between each two adjacent straight lines, each of which is one of straight lines that mutually connect the plurality of transmitters/receivers, by using minimum values, each of which is the minimum value for each distance; and if the absolute value of the difference between 180 degrees and the sum of angles, each of which is the angle between each two adjacent straight lines, inside a triangle formed by straight lines that interconnect three of the plurality of transmitters/receivers is smaller than a predetermined value, processing is executed to take the minimum values as the true values of the distances.

In a position detection system that has a plurality of transmitters/receivers placed at least three positions, the present invention is characterized in that: processing is executed to measure distances among the plurality of transmitters/receivers, each distance being measured a plurality of times, and obtain a minimum value for each distance; processing is executed to obtain an angle between each two adjacent straight lines, each of which is one of straight lines that mutually connect the plurality of transmitters/receivers, by using minimum values each of which is the minimum value for each distance; if the absolute value of the difference between 180 degrees and the sum of angles, each of which is the angle between each two adjacent straight lines, inside a triangle formed by straight lines that interconnect three of the plurality of transmitters/receivers is smaller than a predetermined value, processing is executed to obtain an average value and a variance for each minimum value and for each angle; and if the variance of the minimum value is smaller than a first threshold and the variance of the angle is smaller than a second variance, processing is executed to take the average value of the minimum value as the true value of the distance.

Therefore, distances among a plurality of transmitters/receivers are automatically measured without a human having to manually measure the distances. This enables efficient measurement of distances among a plurality of transmitters/receivers. Therefore, when distances taken as true values and obtained angles are used, the positional coordinates of the plurality of transmitters/receivers can be efficiently measured.

DESCRIPTION OF THE PREFERRED EMBODIMENT

Figure 1:
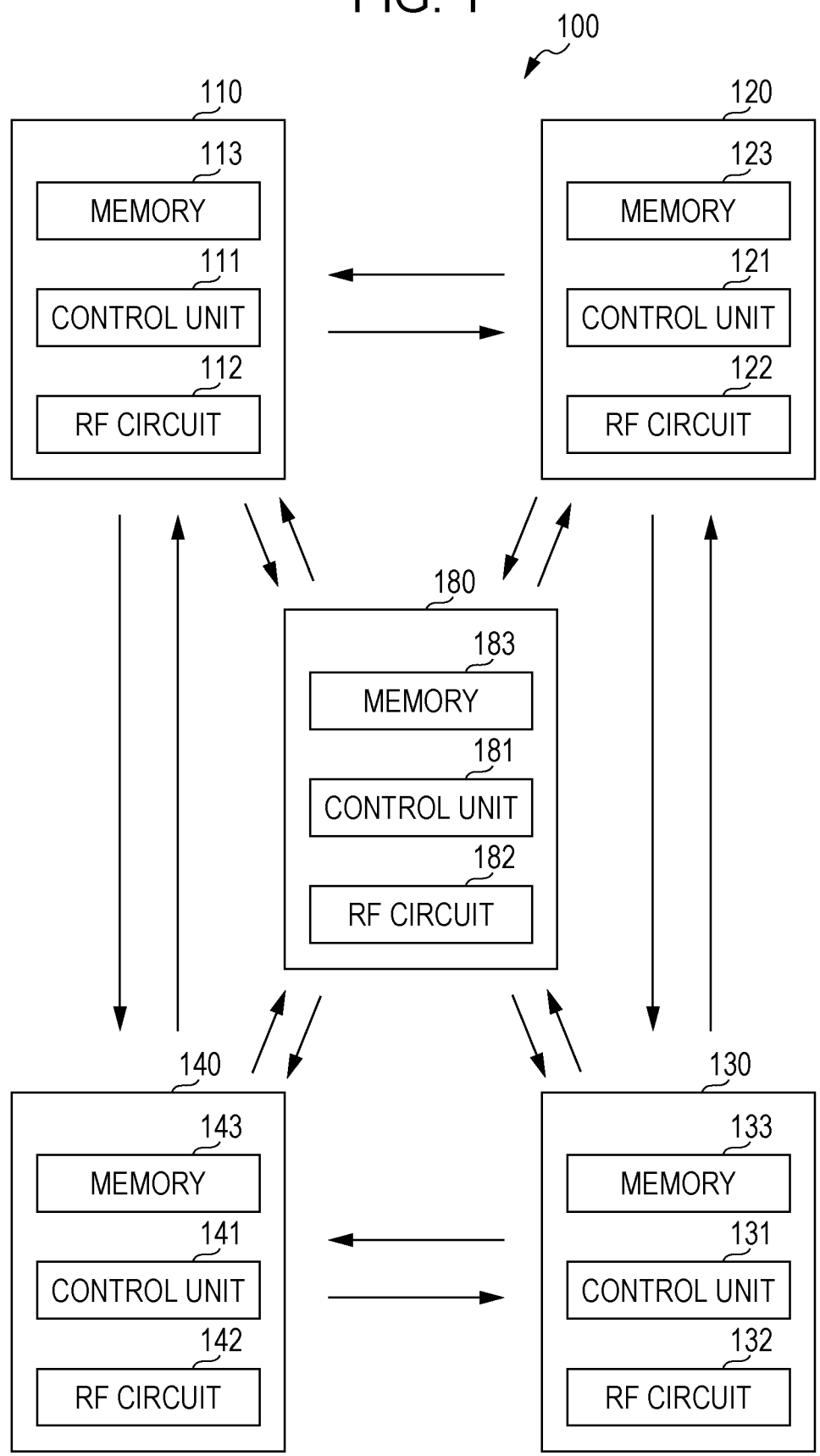
FIG. 1 is a block diagram illustrating a position detection system according to an embodiment of the present invention.

An embodiment of the present invention will be described below with reference to the drawings. In the drawings, like elements are assigned like reference characters and repeated details of these elements will be appropriately omitted.

FIG. 1 is a block diagram illustrating a position detection system according to an embodiment of the present invention.

Figure 2:
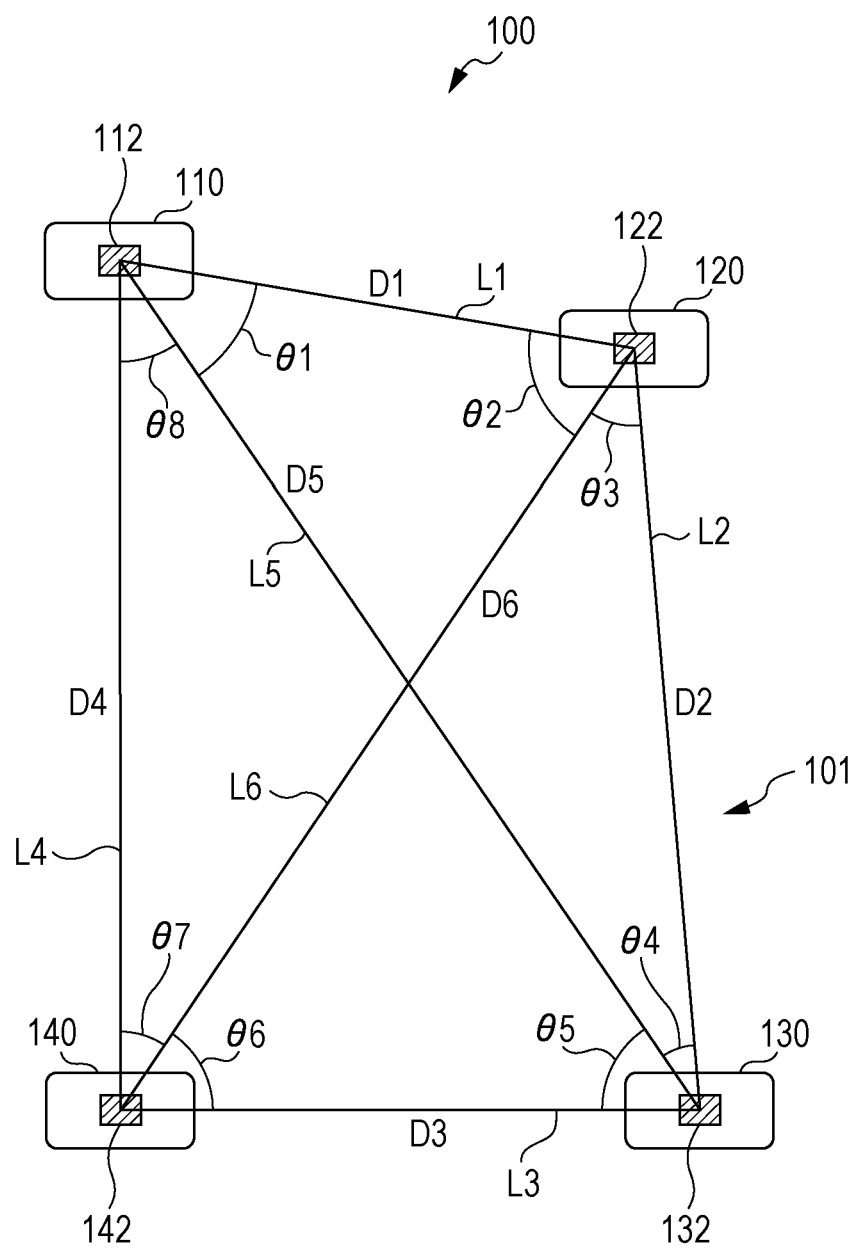
FIG. 2 is a plan view illustrating an example of the placement of the position detection system according to the embodiment.

FIG. 2 is a plan view illustrating an example of the placement of the position detection system according to this embodiment.

In FIG. 2, a slave device 180 is omitted for convenience of explanation.

A position detection system 100 according to this embodiment has a plurality of master devices (first master device 110, second master device 120, third master device 130, and fourth master device 140) and a slave device 180. Master devices are placed at at least three positions. In this embodiment, an example in which four master devices denoted 110, 120, 130 and 140 are placed will be described. The number of master devices to be installed is not limited to 4; five or more master devices may be installed.

As illustrated in FIG. 2, the plurality of master devices denoted 110, 120, 130 and 140 are mutually spaced and fixed to stationary structures such as, for example, columns or walls. Therefore, the plurality of master devices denoted 110, 120, 130 and 140 are not moved. The plurality of master devices denoted 110, 120, 130 and 140 form a measurement area 101 and enclose it.

The slave device 180 is positioned inside the measurement area 101. The slave device 180 is attached to an object for which to measure movement or for which to measure a position at which it is placed, such as, for example, an automobile, a cargo, a commercial product stored in a warehouse, or a human. Examples of the slave device 180 include an electronic tag. If, for example, the movable object is a human, a card or mobile device into which the slave device 180 (electronic tag, for example) is incorporated is carried. The position detection system 100 according to this embodiment measures the position of the slave device 180 to detect the position of the movable object.

As illustrated in FIG. 1, the first master device 110 has a control unit 111, a high-frequency circuit (radio frequency (RF) circuit) 112, and a memory 113. The RF circuit 112 has a transmitter/receiver that can transmit and receive high-frequency signals (RF signals) (for example, high-frequency signals at 10 kilohertz (kHz) and higher). Therefore, the RF circuit 112 is equivalent to a transmitter/receiver in the present invention. The control unit 111 controls the operation of the RF circuit 112 and can also execute processing described later. Programs needed to execute processing are prestored in the memory 113. Processing results are stored in the memory 113.

As illustrated in FIG. 1, the second master device 120 has a control unit 121, an RF circuit 122, and a memory 123. The third master device 130 has a control unit 131, an RF circuit 132, and a memory 133. The fourth master device 140 has a control unit 141, an RF circuit 142, and a memory 143. The slave device 180 has a control unit 181, an RF circuit 182, and a memory 183.

The control units 121, 131, 141, and 181 are similar to the control unit 111 in the first master device 110. The RF circuits 122, 132, 142, and 182 are similar to the RF circuit 112 in the first master device 110. The memories 123, 133, 143, and 183 are similar to the memory 113 in the first master device 110. Therefore, details of the control units 121, 131, 141 and 181, the RF circuits 122, 132, 142 and 182, and the memories 123, 133, 143 and 183 will be omitted.

The RF circuit 112 in the first master device 110 transmits a measurement signal used to measure a distance D1 (see FIG. 2) between the RF circuit 112 in the first master device 110 and the RF circuit 122 in the second master device 120. The measurement signal, which is prestored in the memory 113, is transmitted from the RF circuit 112 according to a control signal transmitted from the control unit 111.

The RF circuit 122 in the second master device 120 receives the measurement result transmitted from the RF circuit 112 in the first master device 110, after which the control unit 121 in the second master device 120 measures the intensity of the measurement signal received by the RF circuit 122 in the second master device 120. The control unit 121 causes the RF circuit 122 to transmit a measurement result for the measurement signal as a reply signal.

The RF circuit 112 in the first master device 110 receives the reply signal transmitted from the RF circuit 122 in the second master device 120, after which the control unit 111 in the first master device 110 calculates the distance D1 between the RF circuit 112 in the first master device 110 and the RF circuit 122 in the second master device 120 according to the reply signal received by the RF circuit 112 in the first master device 110. Thus, the RF circuit 112 in the first master device 110 and the RF circuit 122 in the second master device 120 can constitute a distance measurement sensor and can thereby measure the distance D1 between the RF circuit 112 and the RF circuit 122.

As another method of calculating the distance D1, the control unit 111 in the first master device 110 may measure a difference in phase or a difference in time between the measurement signal transmitted from the RF circuit 112 in the first master device 110 and the reply signal received by the RF circuit 112 in the first master device 110 and may calculate the distance D1 from the difference in phase or time.

This is also true for the RF circuit 132 in the third master device 130 and the RF circuit 142 in the fourth master device 140. Specifically, the RF circuit 122 in the second master device 120 and the RF circuit 132 in the third master device 130 can constitute a distance measurement sensor and can thereby measure a distance D2 between the RF circuit 122 and the RF circuit 132; the RF circuit 132 in the third master device 130 and the RF circuit 142 in the fourth master device 140 can constitute a distance measurement sensor and can thereby measure a distance D3 between the RF circuit 132 and the RF circuit 142; the RF circuit 112 in the first master device 110 and the RF circuit 142 in the fourth master device 140 can constitute a distance measurement sensor and can thereby measure a distance D4 between the RF circuit 112 and the RF circuit 142; the RF circuit 112 in the first master device 110 and the RF circuit 132 in the third master device 130 can constitute a distance measurement sensor and can thereby measure a distance D5 between the RF circuit 112 and the RF circuit 132; and the RF circuit 122 in the second master device 120 and the RF circuit 142 in the fourth master device 140 can constitute a distance measurement sensor and can thereby measure a distance D6 between the RF circuit 122 and the RF circuit 142.

The RF circuit 112 in the first master device 110 transmits a measurement signal used to measure a distance D11 (see FIG. 6) between the RF circuit 112 in the first master device 110 and the RF circuit 182 in the slave device 180. The RF circuit 182 in the slave device 180 receives the measurement signal transmitted from the RF circuit 112 in the first master device 110, after which the control unit 181 in the slave device 180 measures the intensity of the measurement signal received by the RF circuit 182 in the slave device 180. The control unit 181 causes the RF circuit 182 to transmit a measurement result for the measurement signal as a reply signal.

The RF circuit 112 in the first master device 110 receives the reply signal transmitted from the RF circuit 182 in the slave device 180, after which the control unit 111 in the first master device 110 calculates the distance D11 between the RF circuit 112 in the first master device 110 and the RF circuit 182 in the slave device 180 according to the reply signal received by the RF circuit 112 in the first master device 110. Thus, the RF circuit 112 in the first master device 110 and the RF circuit 182 in the slave device 180 can constitute a distance measurement sensor and can thereby measure the distance D11 between the RF circuit 112 and the RF circuit 122.

In this case as well, the control unit 111 in the first master device 110 may measure a difference in phase or a difference in time between the measurement signal and the reply signal and may calculate the distance D11 from the difference in phase or time.

This is also true for the RF circuit 122 in the second master device 120, the RF circuit 132 in the third master device 130, and the RF circuit 142 in the fourth master device 140. Specifically, the RF circuit 122 in the second master device 120 and the RF circuit 182 in the slave device 180 can constitute a distance measurement sensor and can thereby measure a distance D12 (see FIG. 6) between the RF circuit 122 and the RF circuit 182; the RF circuit 132 in the third master device 130 and the RF circuit 182 in the slave device 180 can constitute a distance measurement sensor and can thereby measure a distance D13 (see FIG. 6) between the RF circuit 132 and the RF circuit 182; and the RF circuit 142 in the fourth master device 140 and the RF circuit 182 in the slave device 180 can constitute a distance measurement sensor and can thereby measure a distance D14 (see FIG. 6) between the RF circuit 142 and the RF circuit 182.

To measure the position of the slave device 180 in the position detection system 100, the distances D11, D12, D13, and D14 need to be measured. To measure the distances D11, D12, D13, and D14, the positional coordinates of each of the RF circuits 112, 122, 132, and 142 need to be grasped in advance. It is possible for a person to manually measure the positional coordinates of each of the RF circuits 112, 122, 132, and 142 by using, for example, a measuring tape. If, however, distances among the RF circuits 112, 122, 132, and 142 are relatively long or the number of master devices is relatively large, the efficiency of measuring positional coordinates of the RF circuits may be lowered and it may take time.

In the position detection system 100 according to this embodiment, however, a plurality of RF circuits 112, 122, 132, and 142 measure distances among them to measure the positional coordinates of each of the RF circuits 112, 122, 132, and 142. Therefore, the distances among the RF circuits 112, 122, 132, and 142 are automatically measured without a person having to manually measures these distances. This enables the RF circuits 112, 122, 132, and 142 to efficient measure the positional coordinates among them. Accordingly, it is possible to efficiently measure the positional coordinates of the RF circuits 112, 122, 132, and 142.

This processing will be further described with reference to the relevant drawings.

Figure 3:
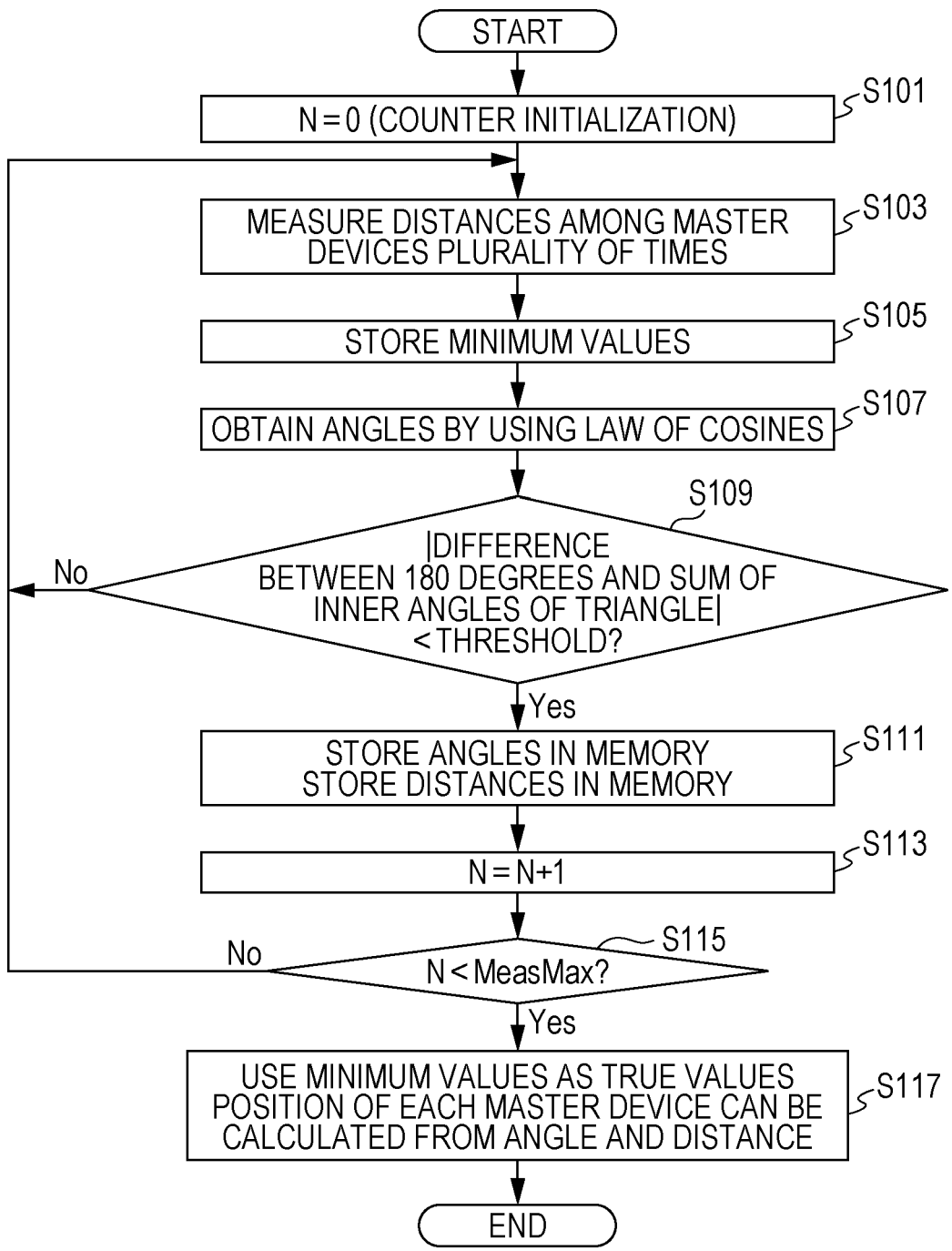
FIG. 3 is a flowchart indicating processing executed by the position detection system according to the embodiment.

FIG. 3 is a flowchart indicating processing executed by the position detection system 100 according to this embodiment.

First, processing to set N to 0 is executed to initialize a counter (step S101). Then, processing is executed to measure distances among the RF circuits 112, 122, 132, and 142 a plurality of times (step S103). Specifically, the RF circuits 112 and 122 measure the distance D1 between them a plurality of times; the RF circuits 122 and 132 measure the distance D2 between them a plurality of times; the RF circuits 132 and 142 measure the distance D3 between them a plurality of times; the RF circuits 112 and 142 measure the distance D4 between them a plurality of times; the RF circuits 112 and 132 measure the distance D5 between them a plurality of times; and the RF circuits 122 and 142 measure the distance D6 between them a plurality of times.

Next, processing is executed to obtain the minimum distances (minimum values) from the measurement results of the distances D1, D2, D3, D4, D5, and D6, each of which has been measured a plurality of times (step S105). Specifically, processing is executed to obtain the minimum value D1$m$ from a plurality of measurement results for the distance D1; processing is executed to obtain the minimum value D2$m$ from a plurality of measurement results for the distance D2; processing is executed to obtain the minimum value D3$m$ from a plurality of measurement results for the distance D3; processing is executed to obtain the minimum value D4$m$ from a plurality of measurement results for the distance D4; processing is executed to obtain the minimum value D5$m$ from a plurality of measurement results for the distance D5; and processing is executed to obtain the minimum value D6$m$ from a plurality of measurement results for the distance D6. When the minimum values D1$m$, D2$m$, D3$m$, D4$m$, D5$m$, and D6$m$ are respectively obtained from the plurality of measurement results for the distances D1, D2, D3, D4, D5, and D6, it is possible to restrain measurements of distances from being affected by multi-pass propagation.

Next, processing is executed to obtain an angle between each two adjacent straight lines of the straight lines that mutually connect the RF circuits 112, 122, 132, and 142 by using the minimum values D1$m$, D2$m$, D3$m$, D4$m$, D5$m$, and D6$m$ and the law of cosines (step S107). Specifically, processing is executed to obtain an angle θ1 between a straight line L1 that interconnects the RF circuits 112 and 122 and a straight line L5 that interconnects the RF circuit 112 and 132 by using the minimum values D1$m$, D2$m$ and D5$m$ and the law of cosines; processing is executed to obtain an angle θ2 between the straight line L1 that interconnects the RF circuits 112 and 122 and a straight line L6 that interconnects the RF circuit 122 and 142 by using the minimum values D1$m$, D4$m$ and D6$m$ and the law of cosines; processing is executed to obtain an angle θ3 between a straight line L2 that interconnects the RF circuits 122 and 132 and the straight line L6 that interconnects the RF circuit 122 and 142 by using the minimum values D2$m$, D3$m$ and D6$m$ and the law of cosines; processing is executed to obtain an angle θ4 between the straight line L2 that interconnects the RF circuits 122 and 132 and the straight line L5 that interconnects the RF circuit 112 and 132 by using the minimum values D1$m$, D2$m$ and D5$m$ and the law of cosines; processing is executed to obtain an angle θ5 between a straight line L3 that interconnects the RF circuits 132 and 142 and the straight line L5 that interconnects the RF circuit 112 and 132 by using the minimum values D3$m$, D4$m$ and D5$m$ and the law of cosines; processing is executed to obtain an angle θ6 between the straight line L3 that interconnects the RF circuits 132 and 142 and the straight line L6 that interconnects the RF circuit 122 and 142 by using the minimum values D2$m$, D3$m$ and D6$m$ and the law of cosines; processing is executed to obtain an angle θ7 between a straight line L4 that interconnects the RF circuits 112 and 142 and the straight line L6 that interconnects the RF circuit 122 and 142 by using the minimum values D1$m$, D4$m$ and D6$m$ and the law of cosines; and processing is executed to obtain an angle θ8 between the straight line L4 that interconnects the RF circuits 112 and 142 and the straight line L5 that interconnects the RF circuit 122 and 132 by using the minimum values D3$m$, D4$m$ and D5$m$ and the law of cosines.

Next, processing is executed to decide whether the absolute value of the difference between 180 degrees and the sum of the inner angles of a triangle formed by straight lines that interconnect three RF circuits is smaller than a predetermined value (threshold) (step S109). Specifically, processing is execute to decide whether the absolute value of the difference between 180 degrees and the sum of the inner angles θ1, θ2, θ3, and θ4 of a triangle formed by the straight lines L1, L2, and L5 that interconnect the three RF circuits 112, 122 and 132 is smaller than a predetermined value; processing is execute to decide whether the absolute value of the difference between 180 degrees and the sum of the inner angles θ5, θ6, θ7, and θ8 of a triangle formed by the straight lines L3, L4, and L5 that interconnect the three RF circuits 112, 132 and 142 is smaller than a predetermined value; processing is execute to decide whether the absolute value of the difference between 180 degrees and the sum of the inner angles θ3, θ4, θ5, and θ6 of a triangle formed by the straight lines L2, L3, and L6 that interconnect the three RF circuits 122, 132 and 142 is smaller than a predetermined value; and processing is execute to decide whether the absolute value of the difference between 180 degrees and the sum of the inner angles θ1, θ2, θ7, and θ8 of a triangle formed by the straight lines L1, L4, and L6 that interconnect the three RF circuits 112, 122 and 142 is smaller than a predetermined value.

If the absolute value of the difference between 180 degrees and the sum of the inner angles of a triangle is smaller than the predetermined value (the result instep S109 is Yes), the relevant angles out of the angles θ1 to θ8 and the relevant values out of the minimum values D1$m$ to D6$m$ are stored in the memory 113 (S111). If the absolute value of the difference between 180 degrees and the sum of the inner angles of the triangle is equal to or larger than the predetermined value (the result instep S109 is No), processing in step S103 is executed.

In step S113 following step S111, processing is executed to advance the counter by setting N to N+1 (step S113). Next, processing is executed to decide whether N is smaller than the maximum value that has been set in advance (step S115). If N is smaller than the maximum value (the result in step S115 is Yes), processing is executed to respectively take the minimum values D1$m$ to D6$m$ as the true values of the distances D1 to D6 among the RF circuits 112, 122, 132, and 142 (step S117). Accordingly, it is possible to efficiently measure the distances D1, D2, D3, D4, D5, and D6 among the RF circuits 112, 122, 132, and 142. When the angles θ1 to θ8 and the distances D1 to D6 are used, the positional coordinates of the RF circuits 112, 122, 132, and 142 can be efficiently measured.

Figure 4:
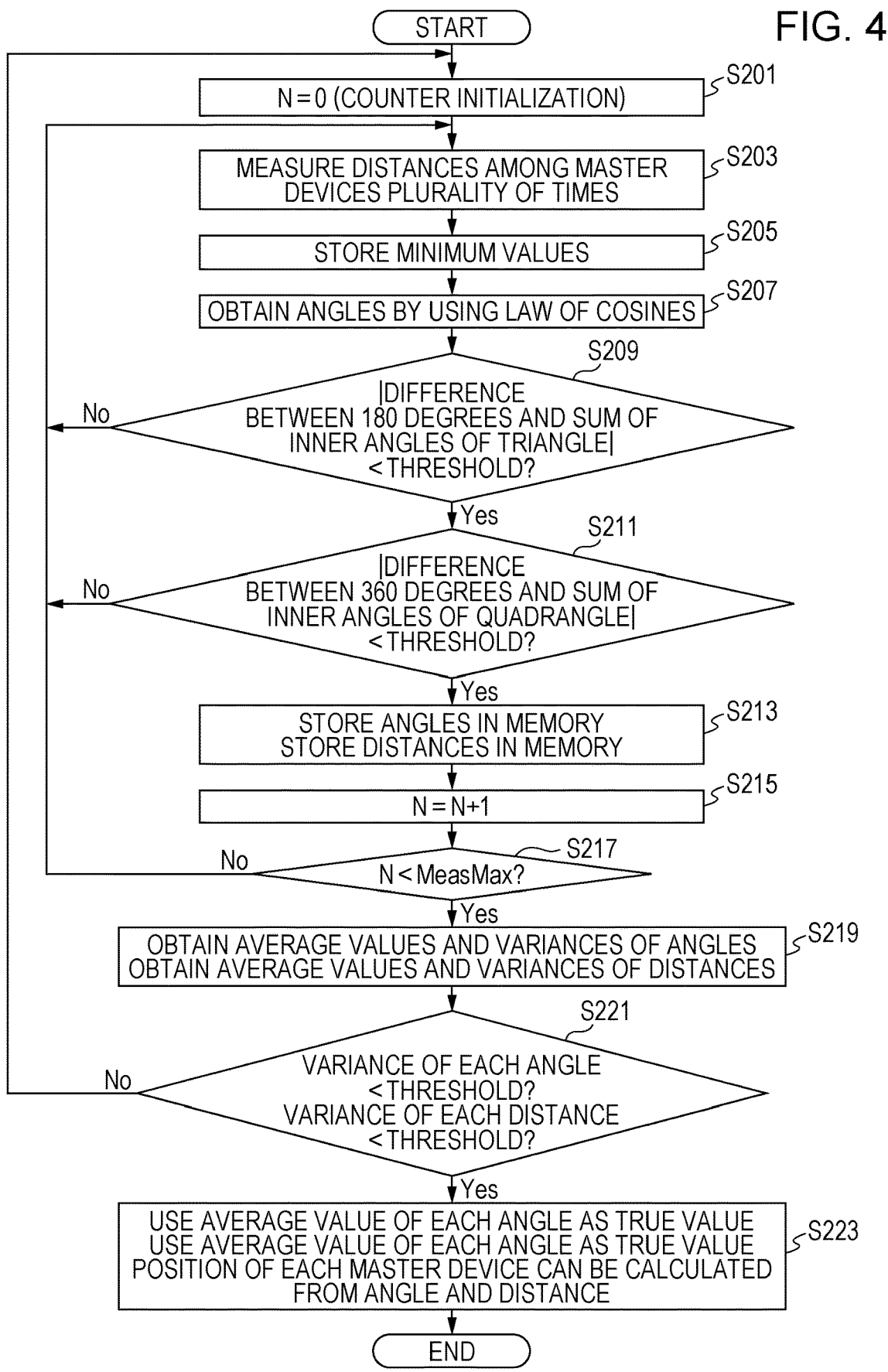
FIG. 4 is a flowchart indicating other processing executed by the position detection system according to the embodiment.

FIG. 4 is a flowchart indicating other processing executed by the position detection system 100 according to this embodiment.

Processing in steps S201, S203, S205, S207, and S209 in FIG. 4 is the same as processing in steps S101, S103, S105, S107, and S109, which has been described above with reference to FIG. 3.

In step S211 following step S209, processing is executed to decide whether the absolute value of the difference between 360 degrees and the sum of the inner angles of a quadrangle formed by straight lines that interconnect four RF circuits is smaller than a predetermined value (threshold) (step S211). Specifically, processing is execute to decide whether the absolute value of the difference between 360 degrees and the sum of the inner angles θ1, θ2, θ3, θ4, θ5, θ6, θ7, and θ8 of a quadrangle formed by the straight lines L1, L2, L3, and L4 that interconnect the four RF circuits 112, 122, 132, and 142 is smaller than a predetermined value.

Processing in steps S213, S215, and S217 following step S211 is the same as processing in steps S111, S113, and S115, which has been described above with reference to FIG. 3. Processing in step S203 following step S211 is the same as processing in S103, which has been described above with reference to FIG. 3.

In step S219 following step S217, processing is executed to obtain the average values θ1$ave$, θ2$ave$, θ3$ave$, θ4$ave$, θ5$ave$, θ6$ave$, θ7$ave$, and θ8$ave$ of the angles θ1, θ2, θ3, θ4, θ5, θ6, θ7, and θ8 and to obtain the variances θ1σ, θ2σ, θ3σ, θ4σ, θ5σ, θ6σ, θ7σ, and θ8σ of the angles θ1, θ2, θ3, θ4, θ5, θ6, θ7, and θ8 (step S219). Processing is also executed to obtain the average values D1$ave$, D2$ave$, D3$ave$, D4$ave$, D5$ave$, and D6$ave$ of the minimum values D1$m$, D2$m$, D3$m$, D4$m$, D5$m$, and D6$m$ and to obtain the variances D1σ, D2σ, D3σ, D4σ, D5σ, and D6σ of the minimum values D1$m$, D2$m$, D3$m$, D4$m$, D5$m$, and D6$m$ (step S219).

Next, processing is executed to decide whether the variances D1σ to D6σ of the minimum values D1$m$ to D6$m$ are smaller than a predetermined value (first threshold) and whether the variances θ1σ to θ8σ of the angles θ1 to θ8 are smaller than a predetermined value (second threshold) (step S221). If the variances D1σ to D6σ of the minimum values D1$m$ to D6$m$ are smaller than the predetermined value (first threshold) and the variances θ1σ to θ8σ of the angles θ1 to θ8 are smaller than the predetermined value (second threshold) (the result in step S221 is Yes), processing is executed to respectively take the average values θ1$ave$ to θ8$ave$ of the angles θ1 to θ8 as the true values of the angles θ1 to θ8 (step S223). If the variances D1σ to D6σ of the minimum values D1$m$ to D6$m$ are smaller than the predetermined value (first threshold) and the variances θ1σ to θ8σ of the angles θ1 to θ8 are smaller than the predetermined value (second threshold) (the result in step S221 is Yes), processing is executed to respectively take the average values D1ave to D6ave of the distances D1m to D6m among the RF circuits 112, 122, 132, and 142 as the true values of the distances D1 to D6 among the RF circuits 112, 122, 132, and 142 (step S223).

Thus, the distances D1, D2, D3, D4, D5, and D6 among the RF circuits 112, 122, 132, and 142 can be more precisely measured. When the angles θ1 to θ8 taken as the true values and the distances D1 to D6 taken as the true values are used, the positional coordinates of the RF circuits 112, 122, 132, and 142 can be more precisely measured. The same effects as described above with reference to FIG. 3 can be obtained.

Figure 5:
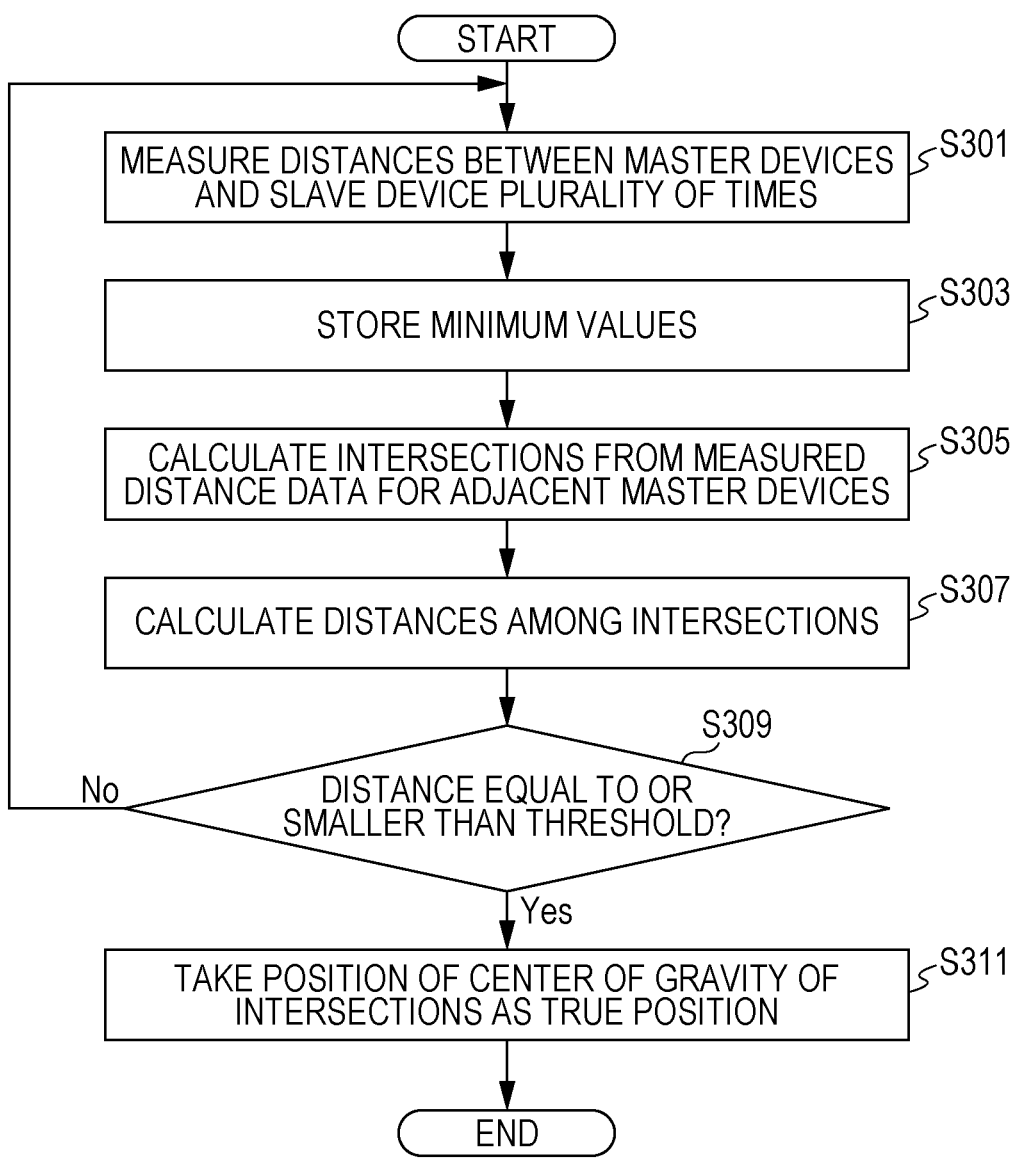
FIG. 5 is a flowchart indicating yet other processing executed by the position detection system according to the embodiment.

FIG. 5 is a flowchart indicating yet other processing executed by the position detection system 100 according to this embodiment.

Figure 6:
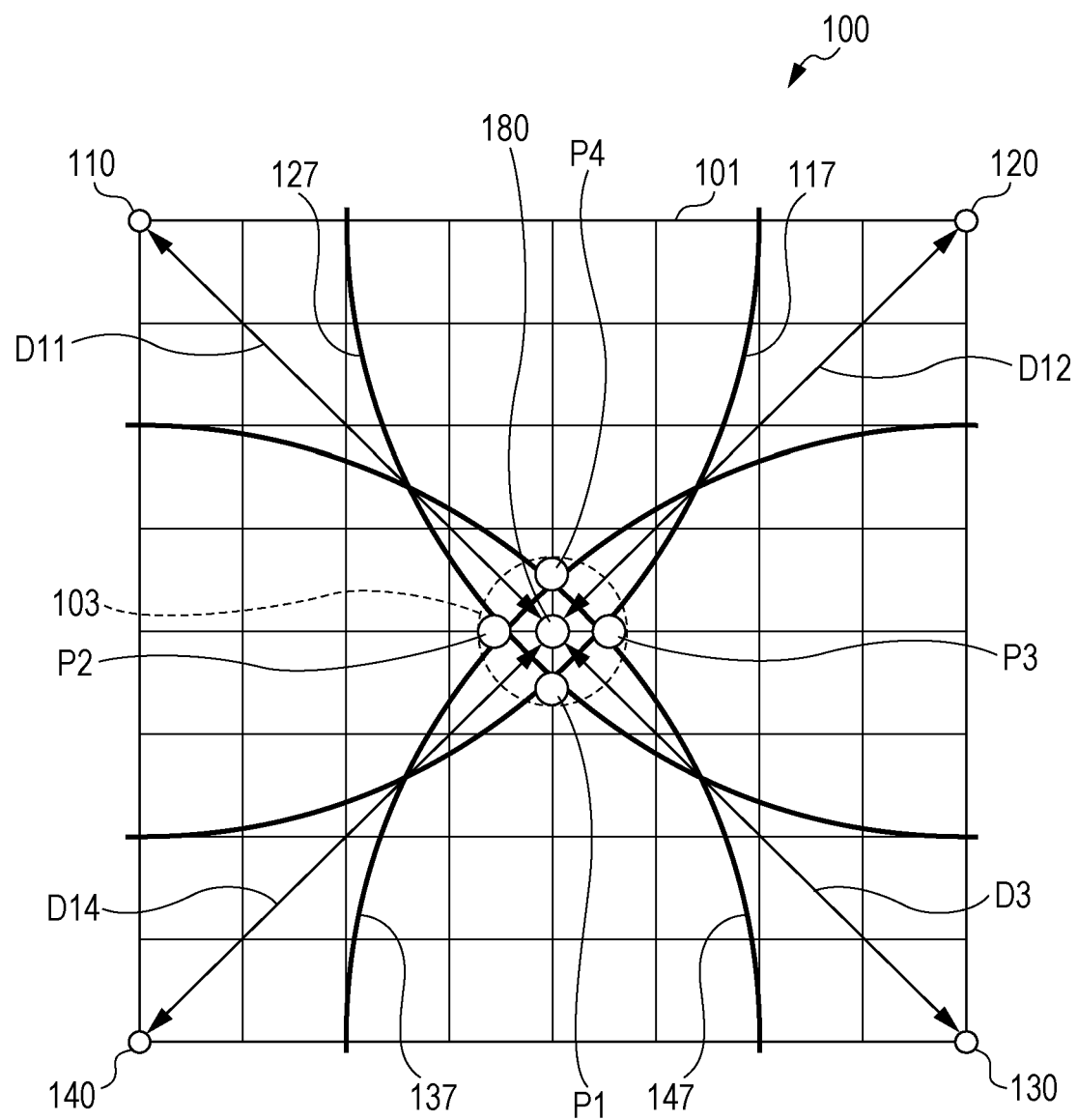
FIG. 6 is a plan view illustrating processing to measure the positional coordinates of a slave device.

FIG. 6 is a plan view illustrating processing to measure the positional coordinates of the slave device 180.

Figure 7:
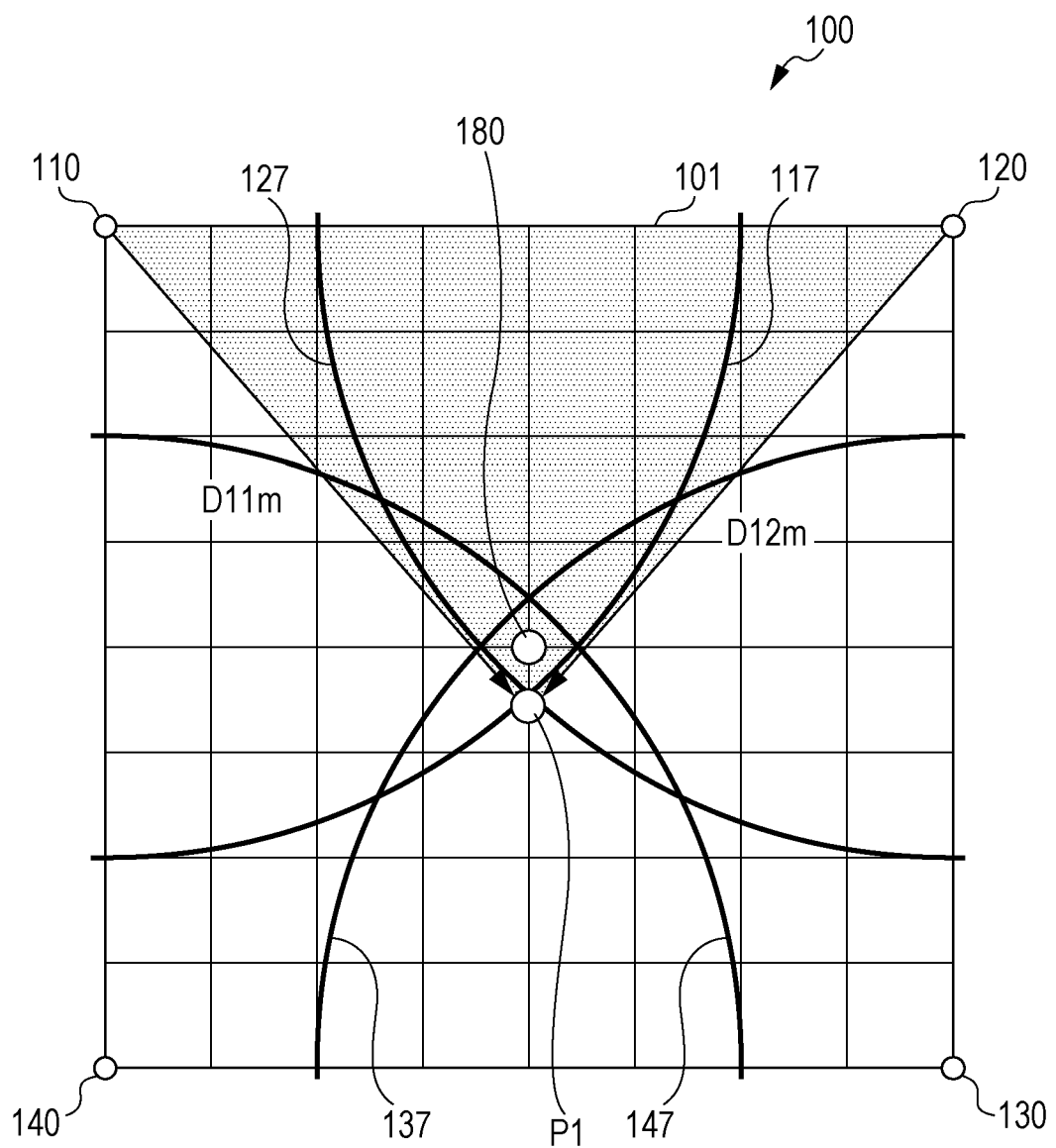
FIG. 7 is a plan view illustrating processing to obtain the position of an intersection of two arcs.

FIG. 7 is a plan view illustrating processing to obtain the position of an intersection P1 of two arcs.

Figure 8:
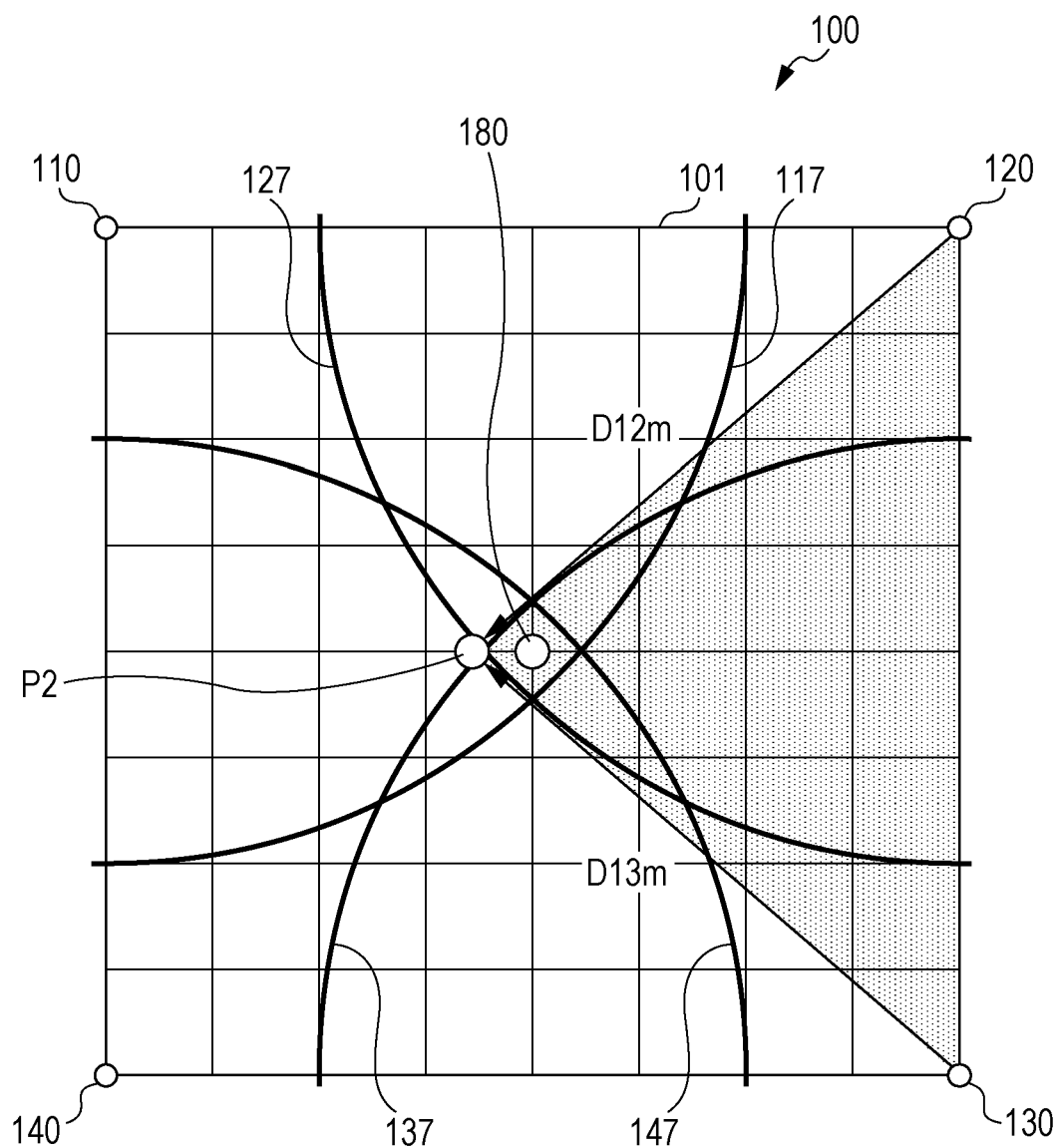
FIG. 8 is a plan view illustrating processing to obtain the position of an intersection of yet another two arcs.

FIG. 8 is a plan view illustrating processing to obtain the position of an intersection P2 of another two arcs.

Figure 9:
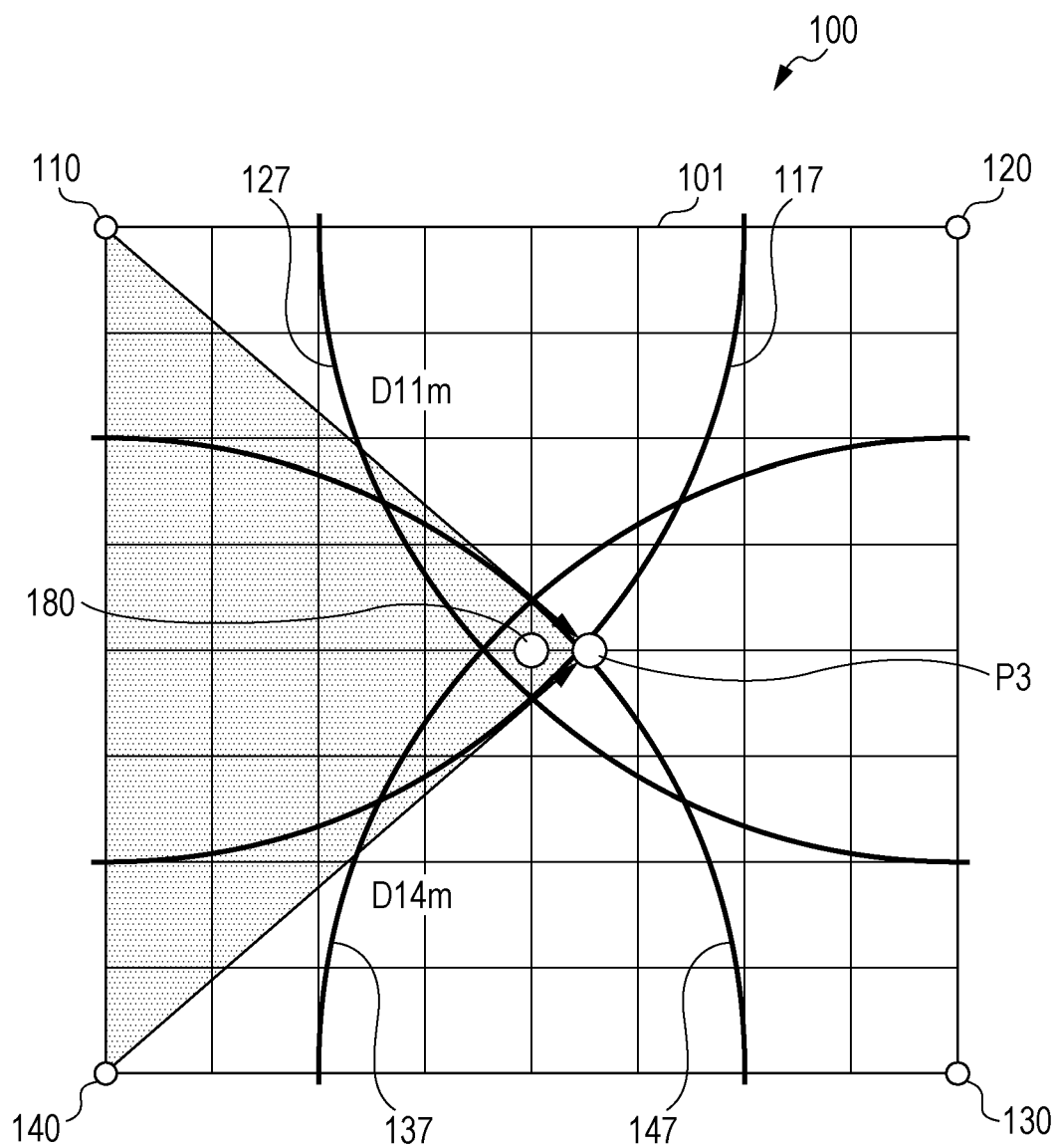
FIG. 9 is a plan view illustrating processing to obtain the position of an intersection of still another two arcs.

FIG. 9 is a plan view illustrating processing to obtain the position of an intersection P3 of yet another two arcs.

Figure 10:
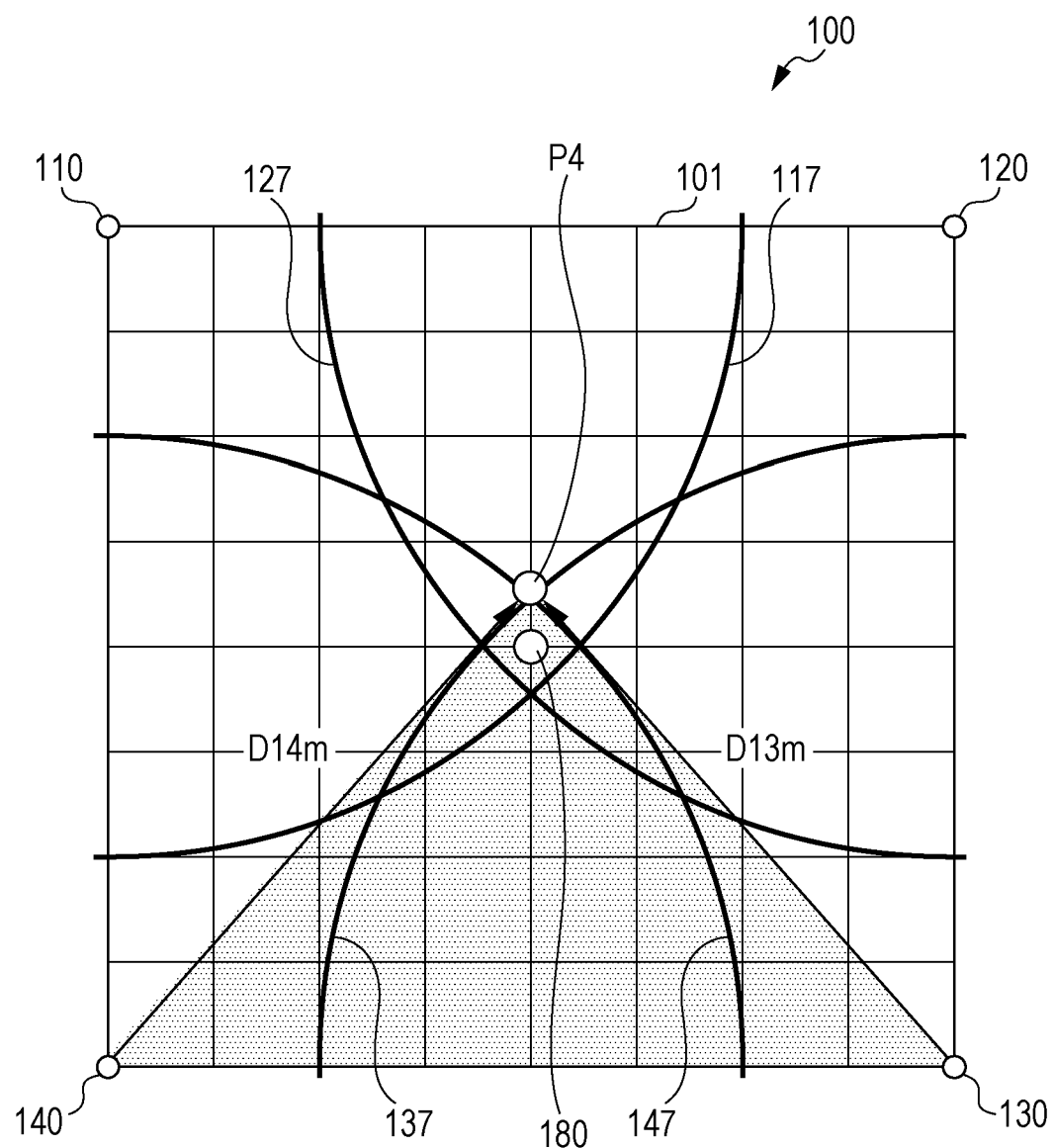
FIG. 10 is a plan view illustrating processing to obtain the position of an intersection of still another two arcs.

FIG. 10 is a plan view illustrating processing to obtain the position of an intersection P4 of still another two arcs.

Figure 11:
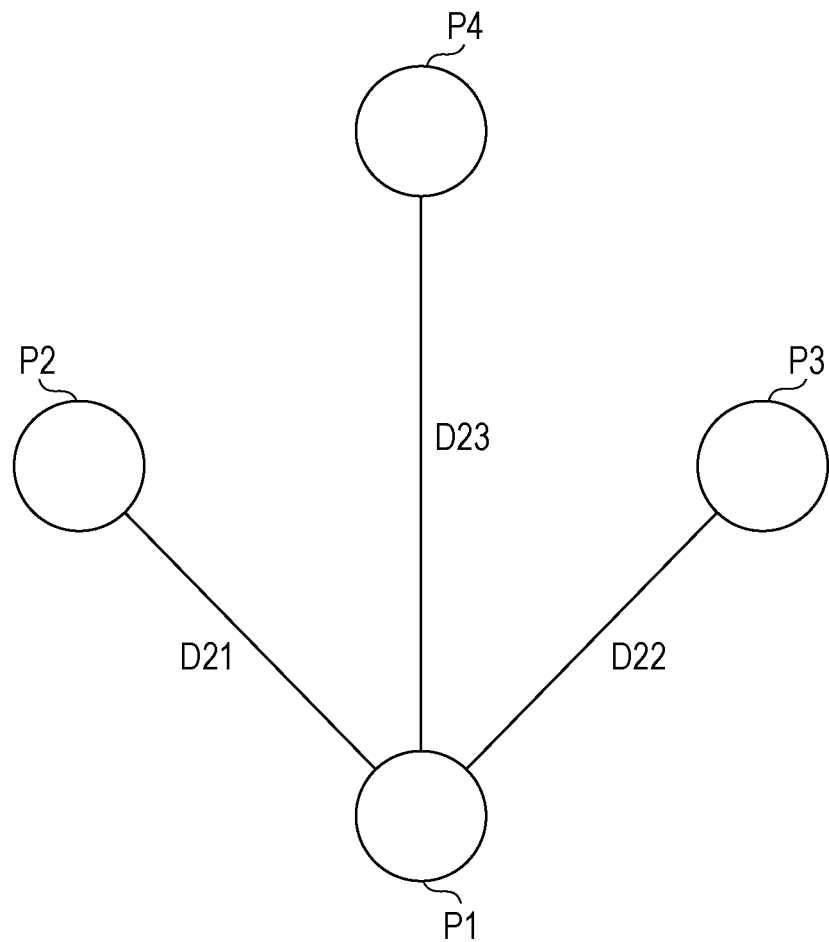
FIG. 11 is an enlarged plan view of an area illustrated in FIG. 6.

FIG. 11 is an enlarged plan view of an area 103 illustrated in FIG. 6.

When processing described above with reference to FIG. 3 or 4 is executed, the positional coordinates of the RF circuits 112, 122, 132, and 142 can be more precisely measured. After that, therefore, the position of the slave device 180 can be measured by measuring the distance D11 between the first master device 110 and the slave device 180, the distance D12 between the second master device 120 and the slave device 180, the distance D13 between the third master device 130 and the slave device 180, and the distance D14 between the fourth master device 140 and the slave device 180.

In this case, in the position detection system 100 according to this embodiment, RF signals are used to measure the distance D11 between the first master device 110 and the slave device 180, the distance D12 between the second master device 120 and the slave device 180, the distance D13 between the third master device 130 and the slave device 180, and the distance D14 between the fourth master device 140 and the slave device 180, as described above with reference to FIGS. 1 and 2. Therefore, the measurements of the distances D11, D12, D13, and D14 may be affected by multi-path propagation. This may lower precision with which the distances D11, D12, D13, and D14 are measured.

In the position detection system 100 according to this embodiment, however, processing is executed to obtain the position of an intersection of two of a plurality of arcs, the centers of which are master devices denoted 110, 120, 130 and 140 and the radii of which are the minimum values D11m, D12m, D13m, and D14m of the distances D11, D12, D13, and D14, after which if distances among a plurality of intersections are equal to or smaller than a predetermined value, the position of the center of gravity of the plurality of intersections is taken as the true position of the slave device 180. If the two arcs have only one intersection in the measurement area 101, the position of the intersection is obtained.

Thus, if the distances among the plurality of intersections are equal to or smaller the predetermined value, the plurality of intersections can be considered to be close together. In this case, the position of the center of gravity of the plurality of intersections is taken as the true position of the slave device 180. Therefore, even if RF signals are used, it is possible to precisely measure the distance D11 between the first master device 110 and the slave device 180, the distance D12 between the second master device 120 and the slave device 180, the distance D13 between the third master device 130 and the slave device 180, the distance D14 between the fourth master device 140 and the slave device 180, and the position of the slave device 180.

This processing will be further described with reference to FIGS. 5 to 11.

As indicated in FIG. 5, processing is first executed to measure the distances between the first master device 110 and the slave device 180, between the second master device 120 and the slave device 180, between the third master device 130 and the slave device 180, and between the fourth master device 140 and the slave device 180, each distance being measured a plurality of times (step S301 categorized as first processing). Specifically, the distance D11 between the RF circuit 112 in the first master device 110 and the RF circuit 182 in the slave device 180 is measured a plurality of times; the distance D12 between the RF circuit 122 in the second master device 120 and the RF circuit 182 in the slave device 180 is measured a plurality of times; the distance D13 between the RF circuit 132 in the third master device 130 and the RF circuit 182 in the slave device 180 is measured a plurality of times; and the distance D14 between the RF circuit 142 in the fourth master device 140 and the RF circuit 182 in the slave device 180 is measured a plurality of times.

Next, processing is executed to obtain the minimum distances (minimum values) from the measurement results of the distances D11, D12, D13, and D14, each of which has been measured a plurality of times (step S303 categorized as first processing). Specifically, processing is executed to obtain the minimum value D11m from a plurality of measurement results for the distance D11; processing is executed to obtain the minimum value D12m from a plurality of measurement results for the distance D12; processing is executed to obtain the minimum value D13m from a plurality of measurement results for the distance D13; and processing is executed to obtain the minimum value D14m from a plurality of measurement results for the distance D14.

Next, processing is executed to obtain an intersection of two arcs from measured distance data for a plurality of adjacent master devices (step S305 categorized as second processing). Specifically, as illustrated in FIG. 7, processing is executed to obtain the intersection P1 between an arc 117, the center of which is the first master device 110 and the radius of which is the minimum value D11m and an arc 127, the center of which is the second master device 120 and the radius of which is the minimum value D12m. As illustrated in FIG. 8, processing is executed to obtain the intersection P2 between the arc 127, the center of which is the second master device 120 and the radius of which is the minimum value D12m and an arc 137, the center of which is the third master device 130 and the radius of which is the minimum value D13m. As illustrated in FIG. 9, processing is executed to obtain the intersection P3 between the arc 117, the center of which is the first master device 110 and the radius of which is the minimum value D11m and an arc 147, the center of which is the fourth master device 140 and the radius of which is the minimum value D14m. As illustrated in FIG. 10, processing is executed to obtain the intersection P4 between the arc 137, the center of which is the third master device 130 and the radius of which is the minimum value D13m and the arc 147, the center of which is the fourth master device 140 and the radius of which is the minimum value D14m.

Thus, in the measurement area 101, only one intersection may be present for each two arcs each of which has a center at one of two adjacent master devices and also has a radius that is the minimum value of the distance between the slave device 180 and the one of the two adjacent master devices. If, in the measurement area 101, only one intersection is present for two arcs, processing to obtain the intersection is executed.

Next, processing is executed to obtain the distances among the intersections P1, P2, P3, and P4 (step S307). For example, as illustrated in FIG. 11, processing is executed to obtain the distance D21 between the intersections P1 and P2, processing is executed to obtain the distance D22 between the intersections P1 and P3, and processing is executed to obtain the distance D23 between the intersections P1 and P4.

Next, processing is executed to decide whether the distance D21 between the intersections P1 and P2, the distance D22 between the intersections P1 and P3, and the distance D23 between the intersections P1 and P4 are equal to or smaller than a predetermined value (threshold) (step S309). If the distances D21, D22, and D23 are equal to or smaller than the threshold (the result in step S309 is Yes), it can be decided that the intersections P1, P2, P3, and P4 are close together. In this case, processing is executed to take the position of the center of gravity of the intersections P1, P2, P3, and P4 as the true position of the slave device 180 (step S311 categorized as third processing). If any one of the distances D21, D22, and D23 is larger than the threshold (the result in step S309 is No), processing in step S301 is executed again.

According to this embodiment, even if RF signals are used, it is possible to precisely measure the distance D11 between the first master device 110 and the slave device 180, the distance D12 between the second master device 120 and the slave device 180, the distance D13 between the third master device 130 and the slave device 180, the distance D14 between the fourth master device 140 and the slave device 180, and the position of the slave device 180.

In step S307, the distances among the intersections P1, P2, P3, and P4 may be obtained with respect to the intersection P2. Specifically, processing may be executed to obtain the distance D21 between the intersections P2 and P1, the distance between the intersections P2 and P3, and the distance between the intersections P2 and P4. Alternatively, the distances among the intersections P1, P2, P3, and P4 may be obtained with respect to the intersection P3.

Specifically, processing may be executed to obtain the distance D22 between the intersections P3 and P1, the distance between the intersections P3 and P2, and the distance between the intersections P3 and P4. Alternatively, the distances among the intersections P1, P2, P3, and P4 may be obtained with respect to the intersection P4.

Specifically, processing may be executed to obtain the distance D23 between the intersections P4 and P1, the distance between the intersections P4 and P2, and the distance between the intersections P4 and P3. Then, processing may be executed in step S309 to decide whether each distance is equal to or smaller than a predetermined value.

Thus, more distances are used to decide whether the intersections P1, P2, P3, and P4 are close together. Therefore, even if RF signals are used, it is possible to more precisely measure the distance D11 between the first master device 110 and the slave device 180, the distance D12 between the second master device 120 and the slave device 180, the distance D13 between the third master device 130 and the slave device 180, the distance D14 between the fourth master device 140 and the slave device 180, and the position of the slave device 180.

Figure 12:
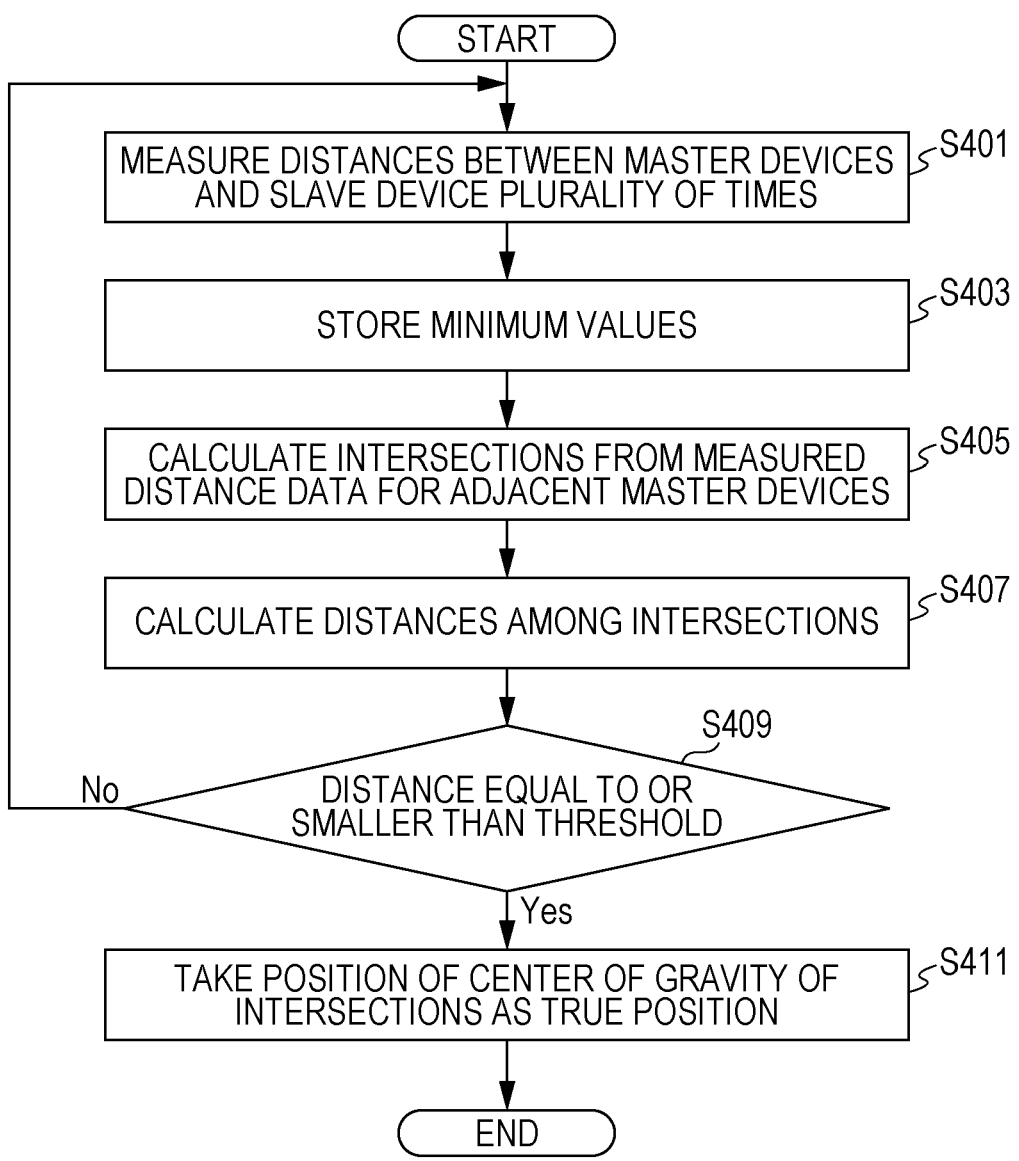
FIG. 12 is a flowchart indicating still other processing executed by the position detection system according to the embodiment.

FIG. 12 is a flowchart indicating still other processing executed by the position detection system 100 according to this embodiment.

Processing in steps S401, S403, and S405 in FIG. 12 is the same as processing in steps S301, S303, and S305, which has described above with reference to FIG. 5.

In step S407 following step S405, processing is executed to obtain the sum S1 of the distances D21, D22, and D23 among the intersections P1, P2, P3, and P4 (step S407). Next, processing is executed to decide whether the sum S1 of the distances D21, D22, and D23 among the intersections P1, P2, P3, and P4 is equal to or smaller than a predetermined value (threshold) (step S409).

If the sum S1 is equal to or smaller than the predetermined value (the result in step S409 is Yes), it can be decided that the intersections P1, P2, P3, and P4 are close together. In this case, processing is executed to take the position of the center of gravity of the intersections P1, P2, P3, and P4 as the true position of the slave device 180 (step S411 categorized as third processing). If the sum S1 is larger than the predetermined value (the result in step S409 is No), processing in step S401 is executed again.

According to this embodiment, the sum S1 of the distances D21, D22, and D23 among the intersections P1, P2, P3, and P4 are used to decide whether the intersections P1, P2, P3, and P4 are close together. Therefore, even if RF signals are used, it is possible to more precisely measure the distance D11 between the first master device 110 and the slave device 180, the distance D12 between the second master device 120 and the slave device 180, the distance D13 between the third master device 130 and the slave device 180, the distance D14 between the fourth master device 140 and the slave device 180, and the position of the slave device 180.

In step S407, the sum S2 of the distances among the intersections P1, P2, P3, and P4 may be obtained with respect to the intersection P2. Specifically, processing may be executed to obtain the distance D21 between the intersections P2 and P1, the distance between the intersections P2 and P3, and the distance between the intersections P2 and P4 and obtain the sum S2 of these distances. Alternatively, the sum S3 of the distances among the intersections P1, P2, P3, and P4 may be obtained with respect to the intersection P3. Specifically, processing may be executed to obtain the distance D22 between the intersections P3 and P1, the distance between the intersections P3 and P2, and the distance between the intersections P3 and P4 and obtain the sum S3 of these distances. Alternatively, the sum S4 of the distances among the intersections P1, P2, P3, and P4 may be obtained with respect to the intersection P4. Specifically, processing may be executed to obtain the distance D23 between the intersections P4 and P1, the distance between the intersections P4 and P2, and the distance between the intersections P4 and P3, and obtain the sum S4 of these distances. Then, processing may be executed in step S409 to decide whether each of the sums S1, S2, S3, and S4 is equal to or smaller than a predetermined value.

Thus, a plurality of sums, S1, S2, S3 and S4, are used to decide whether the intersections P1, P2, P3, and P4 are close together. Therefore, even if RF signals are used, it is possible to more precisely measure the distance D11 between the first master device 110 and the slave device 180, the distance D12 between the second master device 120 and the slave device 180, the distance D13 between the third master device 130 and the slave device 180, the distance D14 between the fourth master device 140 and the slave device 180, and the position of the slave device 180.

Alternatively, in step S409, processing may be executed to decide whether the maximum value of the distances D21, D22, D23, and D24 among the intersections P1, P2, P3, and P4 is equal to or smaller than a predetermined value. Specifically, the maximum value of the distances D21, D22, D23, and D24 among the intersections P1, P2, P3, and P4 may be used to decide whether the intersections P1, P2, P3, and P4 are close together, instead of using the sum of the distances among the intersections P1, P2, P3, and P4. In this case as well, it is possible to decide with higher precision whether the intersections P1, P2, P3, and P4 are close together.

So far, this embodiment of the present invention and its application examples have been described. However, the present invention is not limited to these examples. For example, the scope of the present invention also includes embodiments obtained as a result of adding or deleting constituent element to or from the above embodiment or its application examples, performing design changes to the above embodiment or its application examples, or appropriately combining features in embodiments; the addition, deletion, design change, or combination is effected by a person having ordinary skill in the art without departing from the intended scope of the present invention.

What is claimed is:

1. A position detection system comprising:
a plurality of transmitters/receivers placed at at least three positions, wherein: one or more of the plurality of transmitters/receivers executes a process to measure distances among the plurality of transmitters/receivers, each distance being measured a plurality of times, and obtain a minimum value for each distance;
one or more of the plurality of transmitters/receivers executes a process to obtain an angle between each two adjacent straight lines, each of which is one of straight lines that mutually connect the plurality of transmitters/receivers, by using minimum values, each of which is the minimum value for each distance; and
if an absolute value of a difference between 180 degrees and a sum of angles, each of which is the angle between each two adjacent straight lines, inside a triangle formed by straight lines that interconnect three of the plurality of transmitters/receivers is smaller than a predetermined value, one or more of the plurality of transmitters/receivers executes a process to take the minimum values as true values of the distances.

2. A position detection system comprising:
a plurality of transmitters/receivers placed at at least three positions, wherein: one or more of the plurality of transmitters/receivers executes a process to measure distances among the plurality of transmitters/receivers, each distance being measured a plurality of times, and obtain a minimum value for each distance;
one or more of the plurality of transmitters/receivers executes a process to obtain an angle between each two adjacent straight lines, each of which is one of straight lines that mutually connect the plurality of transmitters/receivers, by using minimum values each of which is the minimum value for each distance;
if an absolute value of a difference between 180 degrees and a sum of angles, each of which is the angle between each two adjacent straight lines, inside a triangle formed by straight lines that interconnect three of the plurality of transmitters/receivers is smaller than a predetermined value, one or more of the plurality of transmitters/receivers executes a process to obtain an average value and a variance for each minimum value and for each angle; and
if the variance of the each minimum value is smaller than a first threshold and the variance of the each angle is smaller than a second variance, one or more of the plurality of transmitters/receivers executes a process to take the average value of the each minimum value as a true value of the distance.

3. The position detection system according to claim 1, wherein the angle is calculated by using the law of cosines.

* * * * *